Oct. 10, 1939.    M. W. DITTO    2,175,517
METHOD OF UTILIZING FUEL OILS IN THE OPERATION OF IRON BLAST FURNACES
Filed March 16, 1939    2 Sheets-Sheet 1
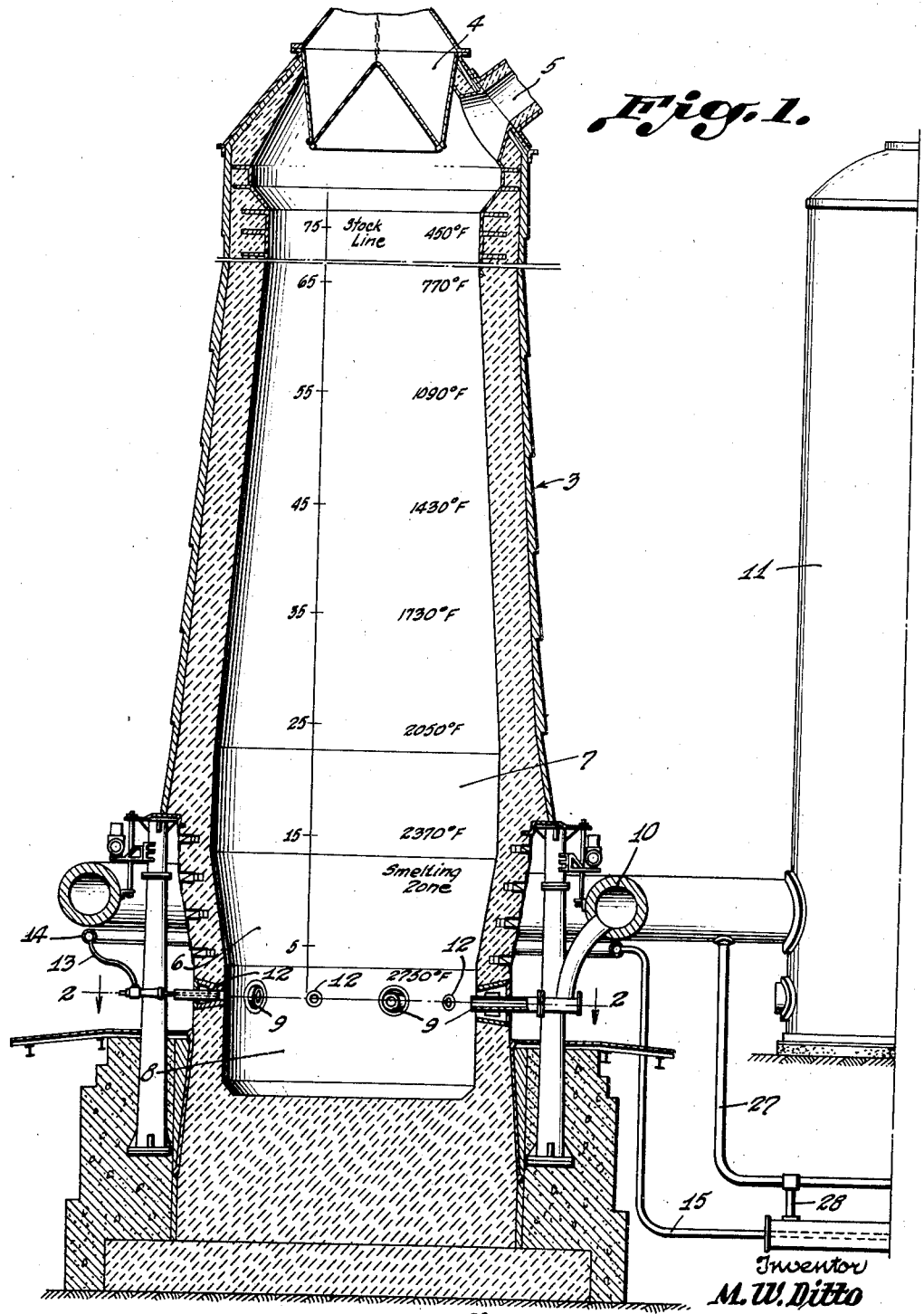

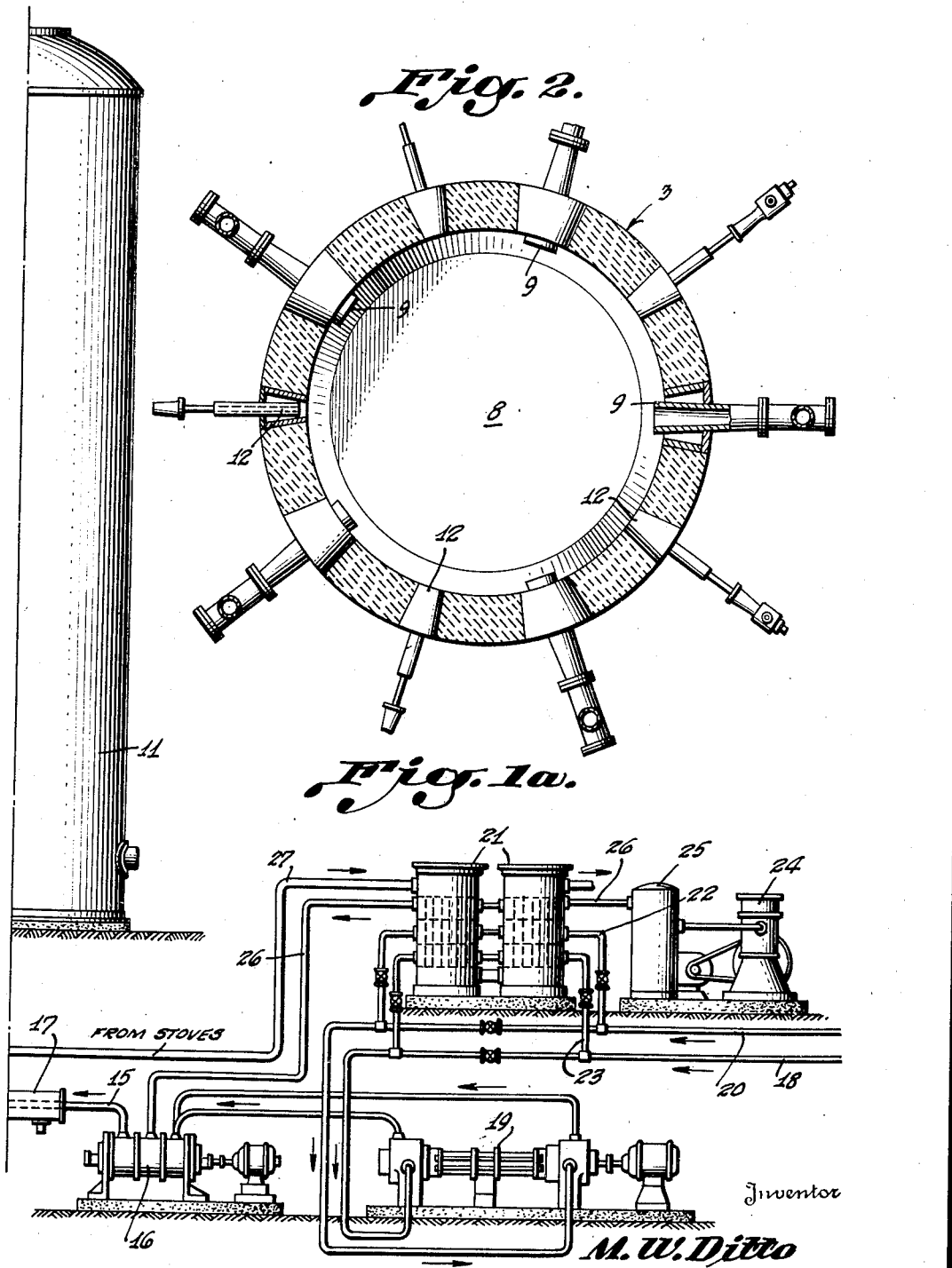

Patented Oct. 10, 1939

2,175,517

UNITED STATES PATENT OFFICE 2,175,517

METHOD OF UTILIZING FUEL OILS IN THE OPERATION OF IRON BLAST FURNACES

Marvin W. Ditto, New York, N. Y., assignor to Emulsions Process Corporation, New York, N. Y., a corporation of Delaware Application March 16, 1939, Serial No. 262,248

3 Claims. (Cl. 75—41)

This invention relates to improvements in the operation of furnaces of the stack type, such as a blast furnace or a cupola furnace.

In modern iron blast furnace practice, the blast furnace charge is made up of iron ore generally in the form of iron oxide containing impurities such as silicon, sulphur, and phosphorus, etc., and lime and carbonaceous material. The normal charge of stock in a blast furnace operated on Mesabi ore is composed of one ton of iron ore containing approximately 48½% iron, 1000 pounds of limestone and one ton of metallurgical coke. Normal practice requires the introduction through the tuyères of sufficient air to burn the coke, and as a result of the combustion the ore is reduced to metallic iron and the impurities contained in the ore are slagged and melted. The product of the furnace is molten pig iron and gases composed largely of nitrogen and carbon monoxide having a thermal value of from 85 to 95 B. t. u. per cubic foot.

One of the objects of this invention is to reduce the amount of nitrogen by reducing the amount of air necessary to complete the oxidation of the fuel. Another is to speed up the combustion rate. A further object is to produce a blast furnace gas of a high calorific value being lower in total nitrogen. These are accomplished by introducing into the furnace through the air tuyères or intermediate tuyères, emulsified fuel oil or tar which is classified as a water-in-oil emulsion containing the required amount of water. For illustration in this application, the figures are developed on the basis of using 50% of water combined with the oil or tar in the emulsion.

Many attempts have been made to introduce water with the blast air into blast furnaces working on the theory that the water would combine with the coke charge to form water gas. These attempts have been failures, due to the fact that the necessary heat to dissociate water vapor cooled the charge at the very point at which the most intense heat was required. In the operation of blast furnaces, to avoid this condition, they have even gone so far as to dry the air before using.

My process can be successfully applied because the foregoing objections are not encountered in practice. Fuel oil or tar emulsified with an equal volume of water, is introduced through suitable water cooled atomizing heads simultaneously with the hot blast air at the tuyères. The emulsion is preheated as high as possible without the formation of carbon. The equal weight of fuel introduced with the water, supplies slightly more than the amount of heat necessary for complete dissociation of the water. The water combines with the carbon in the charge to form CO, and hydrogen, both of which are highly active reducing agents, and are produced because of the heat value of the fuel introduced without a reduction of temperature at the point where it is most needed. The available oxygen from the water is used to produce CO without introducing the large percentage of nitrogen that would be necessary if the oxygen were secured from atmospheric air, thereby raising the calorific value of the resultant blast furnace gas. The throughput of the furnace is increased because of the more rapid combustion rate secured from the burning of the water gas thus formed, and the additional hydrogen aids in causing a rapid reduction of the various oxides present.

Having now indicated, in a general way, the nature and purpose of my invention, I will proceed to a detailed description thereof with reference to the accompanying drawings, in which Fig. 1 is a vertical sectional view partly in elevation of a portion of an apparatus suitable for use in practicing the invention.

Fig. 1a is an elevation of the remainder of the apparatus.

Fig. 2 is a transverse horizontal sectional view taken on the line 2—2 of Fig. 1.

In the drawings, 3 designates a conventional blast furnace having a charging bell 4, a gas outlet 5, a smelting zone 6, a mantle 7, a crucible 8, air blast nozzles 9, a bustle pipe 10 for the blast air, and a hot air stove 11.

In accordance with the invention, emulsion-atomizing nozzles 12 are alternately arranged around the smelting zone between the air blast nozzles 9. These furnaces being circular in shape have the tuyères or nozzles 9 placed around the perimeter of the bosh of the furnace.

The emulsion nozzles are connected by tubes 13 to an emulsion manifold or bustle pipe 14, receiving the emulsion from a pipe 15 connected to the outlet of an emulsifying mill 16 which which may be of the kind disclosed in the R. H. Russell Patent No. 2,059,535, or in my applications Serial Nos. 196,780 and 218,883, filed March 18, 1938, and June 12, 1938, respectively.

The pipe 15 passes through a heat exchanger 17 in which the emulsion is heated.

Referring to Fig. 1a, a suitable hydrocarbon oil, such as fuel oil or tar, is received from a storage tank (not shown) through a pipe 18 which transfers it to one end of a proportioning pump 19, preferably of the kind shown in my application Serial No. 230,480, filed September 17, 1938, but may be a pump structure of the type disclosed in the patent to Fenchelle, No. 1,289,716. Water from any suitable source may be introduced into the opposite end of the pump through a pipe 20. A pump of the type disclosed in my last-mentioned application permits the proportions of water and oil to be varied while the pump is in operation so that I can change the ratio of water to oil at any time.

As it may be desirable to heat the water and oil before introducing these liquids into the pump, I provide heat exchangers 21 that are connected to the pipes 18 and 20 by suitable valved by-pass pipes 22 and 23.

It is also desirable at times to use air or another suitable gas as a constituent of the emulsion made in the mill 16, and therefore, the apparatus may include a compressor 24 and an air or gas storage tank 25. The air or other gas is passed to the mill 16 by a pipe 26, which may extend through the heat exchangers 21.

The exchangers 17 and 21 may be supplied with hot air from the stove 11 by means of a pipe 27 having a branch 28.

At this point it will be noted that the proportioning pump 19 forces the water and oil into the emulsifying mill under a pressure up to 2500 pounds per square inch, and this pressure may be maintained in the emulsifying mill 16, and up to the time that the emulsion is discharged into the blast furnace through the atomizing nozzles 12. In using such apparatus for practicing my process, iron and coke are charged into the furnace at the top through the bell, and of course, any of the customary fluxes may be introduced with the charge.

As the coke is burned in the furnace, the carbon combines with the oxygen in the ore, leaving the iron behind. The carbon in the coke and oxygen in the ore combine to form gases which are released at the top of the furnace through the outlet pipe 5. A great amount of heat is liberated by the burning coke as well as by the burning fuel oil or tar of the emulsion, and the hydrogen resulting from the dissociation of the water, and the iron resulting from the reaction melts and falls to the bottom of the furnace in a molten pool which gathers in the crucible 8. The flux combines with some of the impurities in the ore and makes them liquid. They also fall to the bottom but since they are lighter than iron they float on the top of the pool as slag.

As one charge of ore, coke and flux melts, another charge is fed from the top. The molten iron is drawn off at the bottom every few hours. The furnace operates continuously once it is started. Raw materials go in at the top and iron and slag are drawn off at the bottom, and of course, during the operation, the blast air is introduced through the tuyères 9 in the usual manner, and the emulsion is introduced either continuously or intermittently. The air introduced through nozzles 9 may have a temperature from 1000° F. to 2000° F. depending upon the efficiency of the stove and the period in the cycle after the stove has been heated.

While the furnace is operating, the proportioning pump feeds the water and oil employed as fuel to the emulsifying mill where the water is finely dispersed throughout the oil and where both liquids may be mixed with air or other gas coming from the tank 25. The emulsified mixture then flows from the mill through the pipe 15 to the atomizing nozzles 12, which discharges jets of the atomized emulsion at high velocity into the smelting zone of the furnace.

Many different plans and methods have been made to introduce water into a blast furnace in the past on the theory that in a blast furnace as in a water gas machine the water would combine with the incandescent coke to form water gas and thereby speed up reaction in the furnace by having carbon monoxide and hydrogen available as reducing agents and the heat value resulting from the combustion of said gases. These plans have not been practical or successfully applied because in order to maintain the furnace at its optimum operating temperatures, the heat demand for carrying on the water gas reaction was too high to maintain the temperatures required and the heat balance was interrupted causing an inoperative condition. These ideas generally consisted of introducing water or water vapor through the tuyères of the hot blast and forcing it to contact in the zone of fusion with the hot ore, limestone and coke.

By the use of emulsion the objections to the foregoing efforts are eliminated because in the formation of the water in oil emulsions the combustibility of the oil is not destroyed and sufficient fuel value is contained in the emulsion to supply the heat required for dissociation of the water into its component gases, oxygen and hydrogen. The effect of the release of these gases in the furnace is that the oxygen combines with the carbon of the coke at a very high rate because of its relative purity and the hydrogen acts as a reducing agent combining by contact with the iron oxide of the ore, or with the oxygen contained in the blast air.

In the instance where 50% of water and 50% of oil are combined in the emulsion there is an excess of heat available to carry on the dissociation reaction of the water and consequently there is no heat demand upon the normal fuel of the furnace. Therefore, the amount of oxygen released from the water can replace the equivalent amount of oxygen required from the atmospheric supply and the excess heat value of the oil in the emulsion can be credited to the equivalent quantity of carbon that would be required from the coke to maintain the necessary heat balance so far as fuel is concerned in the furnace.

From calculations, it is determined that with an emulsion containing 50% of water and assuming a heat value of 18,654 B. t. u. per pound of oil and also assuming 100% efficiency of the reactions there would be on the basis of 500 gallons of emulsion supplied to the furnace per hour available heat after the dissociation of water of 23,531,600 B. t. u. per hour.

As a result of the dissociation there would be 222.2 pounds of hydrogen produced and 1,777.8 pounds of oxygen per hour. If all the hydrogen would reoxidize either from oxygen obtained from the iron ore charge or from gases present in the furnace to form water again this would result in 13,776,400 B. t. u. as heat regained.

After dissociating the water, the oxygen would combine with 666 pounds of carbon contained in the coke to make available 9,723,600 B. t. u. The pure oxygen resulting from dissociation of the water would save, because of a lower amount of atmospheric air required to maintain the heat balance, 5,780 pounds of nitrogen per hour which would result at 450 degrees Fahrenheit stack gas temperature in a net gain of 634,123.8 B. t. u. per hour.

By way of recapitulation, I give the following theoretical heat balance using a 50% emulsion in a blast furnace.

Assume for purposes of calculation—
1. On water in oil emulsion having 50% by weight water. The oil following analysis—

| | |
|---|---|
| Carbon | 87.47 |
| Hydrogen | 11.04 |
| Sulphur | .84 |
| Nitrogen | .18 |
| Oxygen and undetermined | .48 |
| B. t. u. per lb | 18,654 |

2. Weight of emulsion to be taken at 8 pounds per gallon.
3. Efficiency of reactions to be taken as 100%.
4. That all the water contained in the emulsion shall be dissociated into hydrogen and oxygen the necessary heat for this reaction shall be taken from the heat contained in the oil of the emulsion at the rate of 62,000 B. t. u.'s for every 9 pounds of water.
5. That 500 gallons per hour of emulsion shall be injected into blast furnace through the tuyères and that sufficient air shall be used to burn the oil in the emulsion to over 15% $CO_2$.

Heat balance

1. Heat from oil after dissociation—23,531,600 B. t. u.
2. Heat from combustion of 222.2 pounds of hydrogen to $H_2O$—$222.2 \times 62,000 = 13,776,400$ B. t. u.
3. Heat from 1777.8 pounds of oxygen with 666 pounds of carbon at 15% $CO_2$, $$\frac{1777.8}{32} \times 12 \times 14600 = 9,723,600 \text{ B. t. u.}$$

4. Heat loss saved from the nitrogen that would usually be present in air is 1777.8 pounds of oxygen were available—

O=23.2% by weight
N=75.5% by weight
23.2:177.8::75.5:N
Nitrogen=5780 pounds
Specific heat of nitrogen .2438
Stack temperature 450° F.
$5780 \times .2438 \times 450 = 638,123.8$ B. t. u.

Reactions 1. 500 gallons per hour of emulsion=4000 pounds
water=2000 pounds
oil=2000 pounds
2. Heat available in oil—$2000 \times 18,654 = 37,308,000$ B. t. u.
3. Heat to dissociate water—

$$\frac{2000}{9} \times 62000 = 13,776,400 \text{ B. t. u.}$$

4. Heat available after dissociation—23,531,600 B. t. u.
5. Hydrogen produced from dissociation of water—

$$\frac{2000}{9} = 222.2 \text{ lbs.}$$

6. Oxygen produced from dissociation of water—$2000 - 222.2 = 1777.8$ lbs.
7. Air required for combustion of 2000 pounds of oil at 15% $CO_2$ 14.57 lbs.$\times 2000 = 29,140$ lbs.

In reference to the foregoing heat balance, I have considered it unnecessary to refer to nitrogen resulting from combustion of the emulsion because it is shown that it required 29,140 pounds of air to burn the oil to 15% $CO_2$ and the result of this combustion released for oxidizing purposes 1,777.8 pounds of oxygen. Therefore, the heat balance is correct for the assumed figures. Of course, four-fifths of the 29,140 pounds of air would be nitrogen which would pass through the furnace but it would require more air than this if the 1,777.8 pounds of oxygen was derived from the air to replace the oxygen of the water. Variable conditions might necessitate the change of water and oil ratio in the emulsion from a low percentage of water of 15% to high percentage of 70%. The basis of 50% of water and oil is only used to illustrate the operating characteristics of this method. Naturally if the lower percentage of water is used, there would be more heat available after the dissociation of the water and if the higher percentage of water is used there would be less heat available after dissociation.

It might be argued that the same result could be obtained by introducing water with the coke or ore at the time of charging same into the furnace or that water vapor might be introduced into the hot blast air through the tuyères and get the same reaction. This is not true because it is necessary to maintain a temperature in the bosh of the furnace of approximately 2750° F. and approximately 2370° F. at the top of the bosh adjacent to the mantle of the furnace.

If excess water were introduced through the tuyères, the critical temperatures in that zone would rapidly decline below that temperature, and the reaction of melting and dissociation of water vapor would cease because of lower temperatures, the furnace would become cold and no longer smelt the ore.

This objection and reaction cannot exist by the use of emulsified fuel oil because by the method of emulsification used, the water becomes an integral part of the emulsion and when introduced into the furnace through atomizer nozzles in a finely divided or atomized state, due to the temperature of the zone in which it is introduced, a rapid rate of combustion takes place, as a result of the combustion of the oil combined in the emulsion. The water contained therein is raised to the flame temperature produced by the burning emulsion. This flame temperature is far above the temperature of dissociation and there is an immediate dissociation of water into its component gases as well as a gain in heat in that zone because of the excess heat value contained in the emulsion resulting from the combustion of the oil which composes a part of the emulsion. Therefore, the reaction of dissociation not only takes place rapidly but is carried on in a condition of ascending temperatures rather than descending temperatures and oxygen is made available immediately for combination either with the incandescent carbon of the coke or the hydrogen is immediately available to combine with the oxygen contained in the ore, or with the oxygen present in the gases of the furnace and act either as fuel to raise the temperature of the charge or as a reducing agent to absorb oxygen from the descending ore charge.

As a result of a higher rate of oxidation of fuel as well as higher rate of reduction of the iron ore, the capacity of the furnace is increased thereby reducing the cost of producing iron because of larger tonnage being produced at the same capital investment. To apply the method does not require any change in design of the furnace other than the installation of tuyères for the purpose of introducing the emulsion into the smelting zone.

By this method it is possible to enrich the gases with both hydrogen and oxygen carrying on the reactions required in a practical way and to supply the necessary heat to maintain a proper heat balance in the furnace. The water is the source of these pure gases which in the gaseous state speed up these reactions and eliminate the equivalent amount of atmospheric nitrogen that would otherwise have to be introduced.

The invention is also applicable to cupola furnaces commonly used in foundries for the purpose of making cast iron and semi-steel castings. Such a furnace is very similar to a blast iron furnace except that it has straight sides and a built-in bustle box instead of the bustle pipe forming a conventional part of a blast furnace. Air from a blower is connected by a pipe to the wind box and is discharged from the latter through tuyères into the shaft of the furnace.

In employing my invention with a cupola furnace, I would install a circular manifold or emulsion header about the lower portion of the wind box and would feed the emulsion from such manifold through nozzles into the shaft at points adjacent to the tuyères.

Such a furnace is charged with coke, pig iron and flux which may be required to meet the specifications of the castings. The combustion of the coke melts the iron and the flux eliminates the impurities by the formation of slag, and the molten iron is tapped from the furnace into ladles.

So far as the operation of a cupola furnace is concerned, it is substantially the same practice as operating a blast furnace except that pig iron and scrap are charged instead of iron ore, and due allowance is made for metallurgical requirements so far as fluxing is concerned.

In using the invention in the operation of a cupola furnace, the emulsion comprising water finely dispersed in a suitable fuel oil will be injected into the smelting zone of the furnace under high velocity.

While I have disclosed what I deem to be a preferred method of procedure, I do not wish to be limited thereto as there might obviously be changes made in the modus operandi without departing from the spirit of the invention as comprehended within the scope of the appended claims.

What I claim and desire to secure by Letters Patent is:

1. In a process for the production of pig iron in a blast furnace, the step of introducing a water-in-fuel oil emulsion into the tuyère zone of the furnace, the oil in the emulsion being sufficient upon combustion to generate at least the amount of heat required to decompose the water vapor derived from the water to form carbon monoxide and hydrogen in the presence of the carbon produced by the cracking of the hydrocarbons of the fuel oil and whereby a gas of high calorific value and relatively low in total nitrogen is produced.

2. In a process for the production of pig iron in a blast furnace, the step of introducing a water-in-fuel oil emulsion into the tuyère zone of the furnace, the oil in the emulsion being sufficient upon combustion to generate at least the amount of heat required to decompose the water vapor derived from the water to form carbon monoxide and hydrogen in the presence of the carbon produced by the cracking of the hydrocarbons of the fuel oil and whereby a gas of high calorific value and relatively low in total nitrogen is produced, the emulsion, prior to its introduction into the furnace, being heated as high as possible without the formation of carbon.

3. In a process for the production of pig iron in a blast furnace, the step of introducing a water-in-fuel oil emulsion into the tuyère zone of the furnace, the oil in the emulsion being sufficient upon combustion to generate at least the amount of heat required to decompose the water vapor derived from the water to form carbon monoxide and hydrogen in the presence of the carbon produced by the cracking of the hydrocarbons of the fuel oil and whereby a gas of high calorific value and relatively low in total nitrogen is produced, the emulsion comprising a gas containing oxygen.

MARVIN W. DITTO.